US010308099B1

(12) United States Patent
Vemulapati et al.

(10) Patent No.: US 10,308,099 B1
(45) Date of Patent: Jun. 4, 2019

(54) SUN VISOR ASSEMBLY WITH INTEGRATED MICROPHONE

(71) Applicant: FORD GLOBAL TECHNOLOGIES, LLC, Dearborn, MI (US)

(72) Inventors: Satyanarayana Raju Vemulapati, Westland, MI (US); Larry Fink, Southgate, MI (US); Daniel Weckstein, West Bloomfield, MI (US); Matt Anthony Majkowski, Dearborn, MI (US); Marcia Edna Troychak, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/031,644

(22) Filed: Jul. 10, 2018

(51) Int. Cl.
    *B60J 3/02* (2006.01)
    *B60R 11/02* (2006.01)
    *B60R 11/00* (2006.01)
    *H04R 1/34* (2006.01)

(52) U.S. Cl.
    CPC ......... *B60J 3/0278* (2013.01); *B60R 11/0247* (2013.01); *H04R 1/342* (2013.01); *B60R 2011/0035* (2013.01)

(58) Field of Classification Search
    CPC .... H04R 1/342; B60J 3/0278; B60R 11/0247; B60R 2011/0035
    See application file for complete search history.

(56) References Cited

U.S. PATENT DOCUMENTS

| 4,905,270 A | * | 2/1990 | Ono | B60R 11/0247 379/420.01 |
|---|---|---|---|---|
| 7,503,616 B2 | | 3/2009 | Linhard et al. | |
| 2013/0311175 A1 | | 11/2013 | Arakawa et al. | |
| 2014/0093114 A1 | * | 4/2014 | Nguyen | H04R 1/02 381/361 |
| 2015/0010186 A1 | | 1/2015 | Larsen | |

FOREIGN PATENT DOCUMENTS

| CN | 202931568 U | | 5/2013 |
|---|---|---|---|
| CN | 204750032 U | * | 11/2015 |
| JP | 2015140128 A | | 8/2015 |
| KR | 20070033750 A | | 3/2007 |

OTHER PUBLICATIONS

English Machine Translation of CN202931568U.
English Machine Translation of JP2015140128A.
English Machine Translation of KR20070033750A.

* cited by examiner

*Primary Examiner* — Sonia L Gay
(74) *Attorney, Agent, or Firm* — Vichit Chea; King & Schickli, PLLC

(57) ABSTRACT

A sun visor assembly includes a body having a first face, a second face and an internal receiver between the first face and the second face. The sun visor assembly also includes a microphone that his held in the internal receiver as well as a baffle that is carried on the body and configured to efficiently and effectively direct sound toward the microphone.

15 Claims, 3 Drawing Sheets

SUN VISOR ASSEMBLY WITH INTEGRATED MICROPHONE

TECHNICAL FIELD

This document relates generally to the motor vehicle equipment field and, more particularly, to a sun visor assembly incorporating an integrated microphone providing improved voice command and voice communication functionality, improved customer satisfaction, improved microphone packaging and reduced tooling assembly costs.

BACKGROUND

Traditionally, microphones for voice command and voice communication in motor vehicles have been designed into interior components such as the headliner, floor consoles, instrument panel or overhead consoles. Unfortunately, these locations are relatively remote from the driver and often require packaging compromises in order to ensure that the unidirectional microphone is properly angularly oriented to pick up the voice commands and communications of the driver. As a result, the packaging of microphones in the traditional locations has often negatively impacted total package volume, driving larger parts and reducing interior cabin space. Part complexity has also been increased due to add-on unique parts such as microphone bezels and connectors. Fit and finish and final interior appearance has also been compromised.

This document relates to a sun visor assembly incorporating an integrated microphone for voice command and voice communication. Such a microphone may be readily accommodated in the existing space within the interior of the sun visor so as to avoid adversely affecting interior cabin space and package volume while optimizing the location of the microphone with respect to position of the driver for more efficient and effective sound detection and thereby providing enhanced functionality.

SUMMARY

In accordance with the purposes and benefits as described herein, a new and improved sun visor assembly is provided. That sun visor assembly incorporates an integrated microphone. More particularly, the sun visor assembly comprises a body having a first face, a second face and an internal receiver between the first face and the second face. The sun visor assembly also includes a microphone that is held in that internal receiver. Further, the sun visor assembly includes a baffle carried on the body configured to direct sound toward the microphone. Advantageously, the new baffle design functions to direct sound waves from two different directions into a unidirectional microphone thereby providing optimum microphone performance whether the visor is in a raised or stowed position or a lowered or use position. Advantageously, the location of the microphone within the sun visor reduces wiring length when compared to microphones mounted in a headliner or overhead console.

The sun visor assembly may further include a first sound port in the first face and a second sound port in the second face. In addition, the sun visor assembly may further include a first grille integrated into the first face over the first sound port. Further, the sun visor assembly may further include a second grille integrated into the second face over the second sound port.

Still further, the sun visor assembly may include a baffle also integrated into the interior of the body of the sun visor assembly behind the first and second grilles.

More particularly, that baffle may include a first acoustic surface oriented toward the first sound port and a second acoustic surface oriented toward the second sound port. Both the first acoustic surface and the second acoustic surface may be arcuate. Further, the first acoustic surface may converge toward the second acoustic surface from a first end of the baffle toward a second end of the baffle. The second end of the baffle may also be oriented toward the microphone.

In the following description, there are shown and described several preferred embodiments of the sun visor assembly. As it should be realized, the sun visor assembly is capable of other, different embodiments and their several details are capable of modification in various, obvious aspects all without departing from the sun visor assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the sun visor assembly and together with the description serve to explain certain principles thereof.

Reference will now be made in detail to the present preferred embodiments of the sun visor assembly, examples of which are illustrated in the accompanying drawing figures.

DETAILED DESCRIPTION

Figure 1:
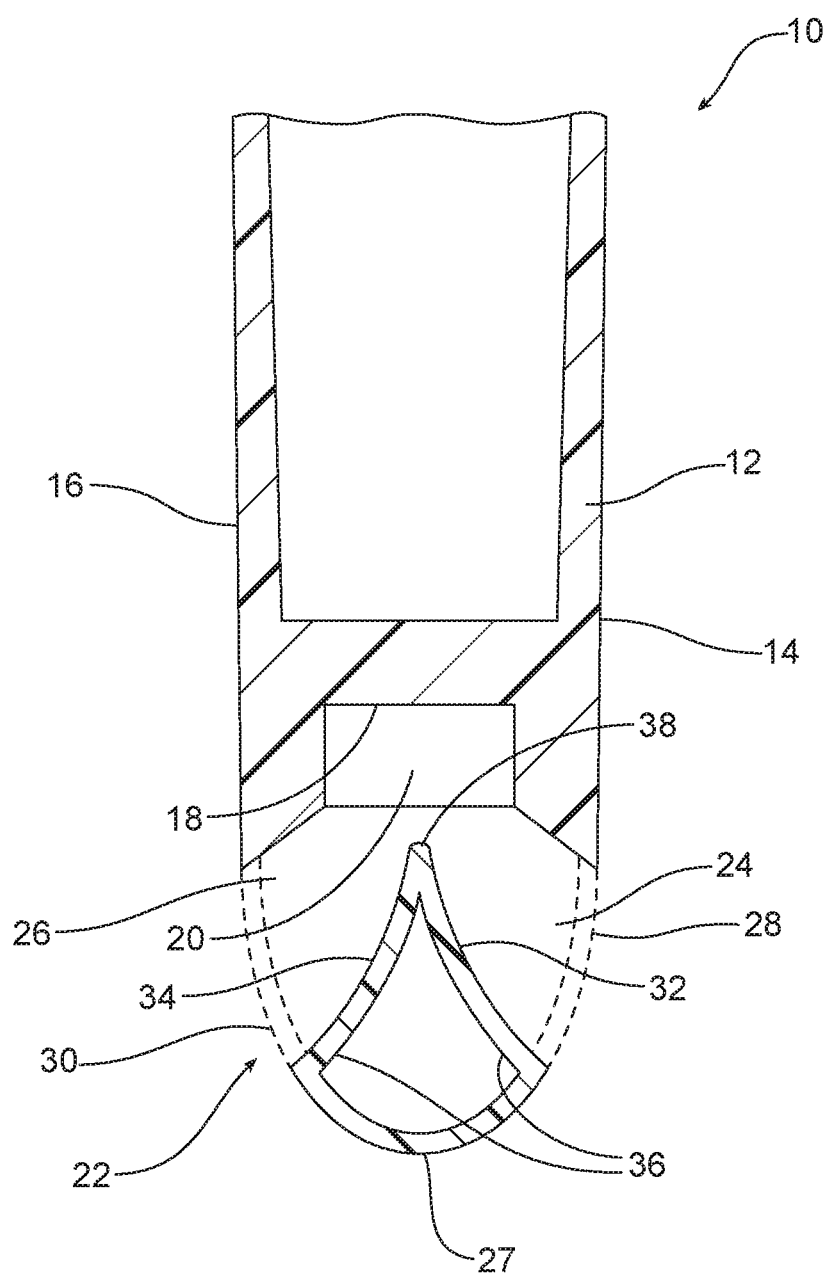
FIG. 1 is a detailed cross-sectional view of the sun visor assembly showing how the microphone and baffle are integrated internally into the body of the sun visor assembly behind first and second integrated grilles.

Reference is now made to FIG. 1 illustrating the new and improved sun visor assembly 10. That sun visor assembly 10 incorporates a body 12 having a first face 14, a second face 16 and an internal receiver 18 between the first face and the second face. A microphone 20 is held in the receiver 18 and thereby integrated into the sun visor assembly 10. The microphone 20 may comprise a unidirectional microphone of a type known in the art useful for voice command and voice communication in a motor vehicle.

A baffle 22 is also carried on the body 12. That baffle 22 is configured to direct sound and, more particularly, the voice of the driver of the motor vehicle, toward the unidirectional microphone 20 regardless of the position of the body 12 of the sun visor assembly 10.

More specifically, the baffle 22 is positioned internally in the body 12 between a first sound port 24 in the first face 14 and a second sound port 26 in the second face 16. The first sound port 24 and the second sound port 26 are located adjacent to the free edge 27 of the sun visor body 12.

A first grille 28 is integrated into the first face 14 over the first sound port 24. Similarly, a second grille 30 is integrated into the second face 16 over the second sound port 26. The body 12, including the first grille 28 and the second grille 30, may be formed from a plastic material. In one possible embodiment, the body 12, the first grille 28 and the second grille 30 are formed as a single unitary piece (i.e. not assembled from multiple parts) by 3D printing processes. In other embodiments, the body 12, the first grille 28 and the second grille 30 may be made by traditional manufacturing methods.

As should be appreciated from viewing FIG. 1, the microphone 20 and the baffle 22 are integrated into the internal portion of the body 12 behind the first grille 28 and the second grille 30 where they are hidden from view. This provides an aesthetically pleasing appearance while also eliminating the need to make discreet bezels and then assemble them to the body 12 of the sun visor assembly 10. As such, this advantageously reduces capital expenditures, assembly costs and part counts.

The baffle 22 includes a first acoustic surface 32 and a second acoustic surface 34. The first acoustic surface 32 is oriented toward the first sound port 24. The second acoustic surface 34 is oriented toward the second sound port 26.

More particularly, the first acoustic surface 32 is smooth and arcuate having a concave feature adapted or configured to efficiently direct sound entering the first sound port 24 through the first grille 28 toward the unidirectional microphone 20. Similarly, the second acoustic surface 34 is smooth and arcuate, also forming a concave feature that directs sound passing through the second grille 30 into the second sound port 26 toward the unidirectional microphone 20. Toward this end, the first acoustic surface 32 converges toward the second acoustic surface 34 from a first end 36 of the baffle 22 toward a second end 38 of the baffle. In the illustrated embodiment, the wide or first end 36 of the baffle 22 is oriented toward and located adjacent to the free edge 27 of the sun visor body 12. The microphone 20 is also oriented toward the free edge 27 of the sun visor body 12.

Figure 2:
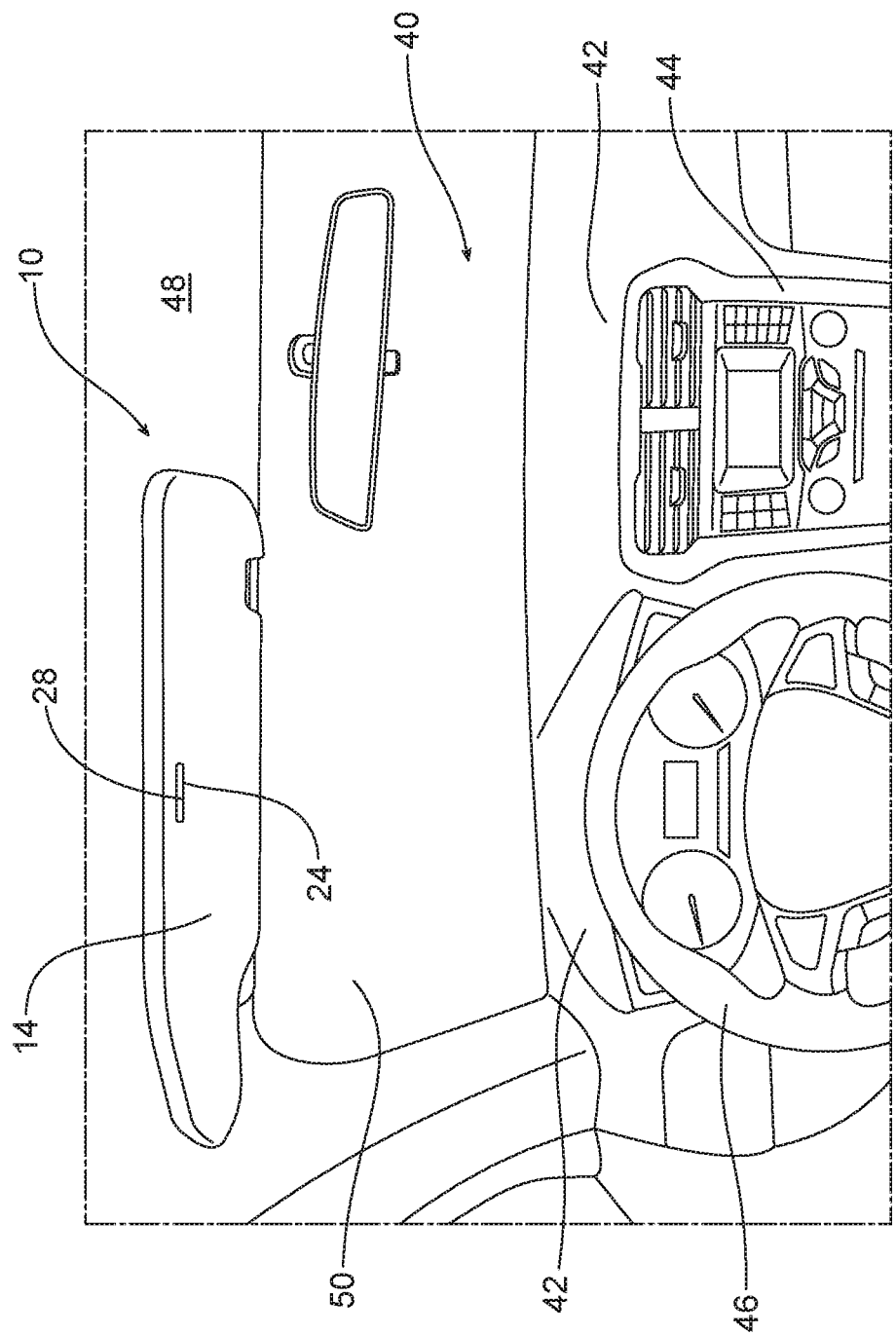
FIG. 2 is an illustration of the interior of a motor vehicle equipped with the sun visor assembly illustrated in FIG. 1 with that sun visor assembly oriented in a stowed position flat against the headliner.
Figure 3:
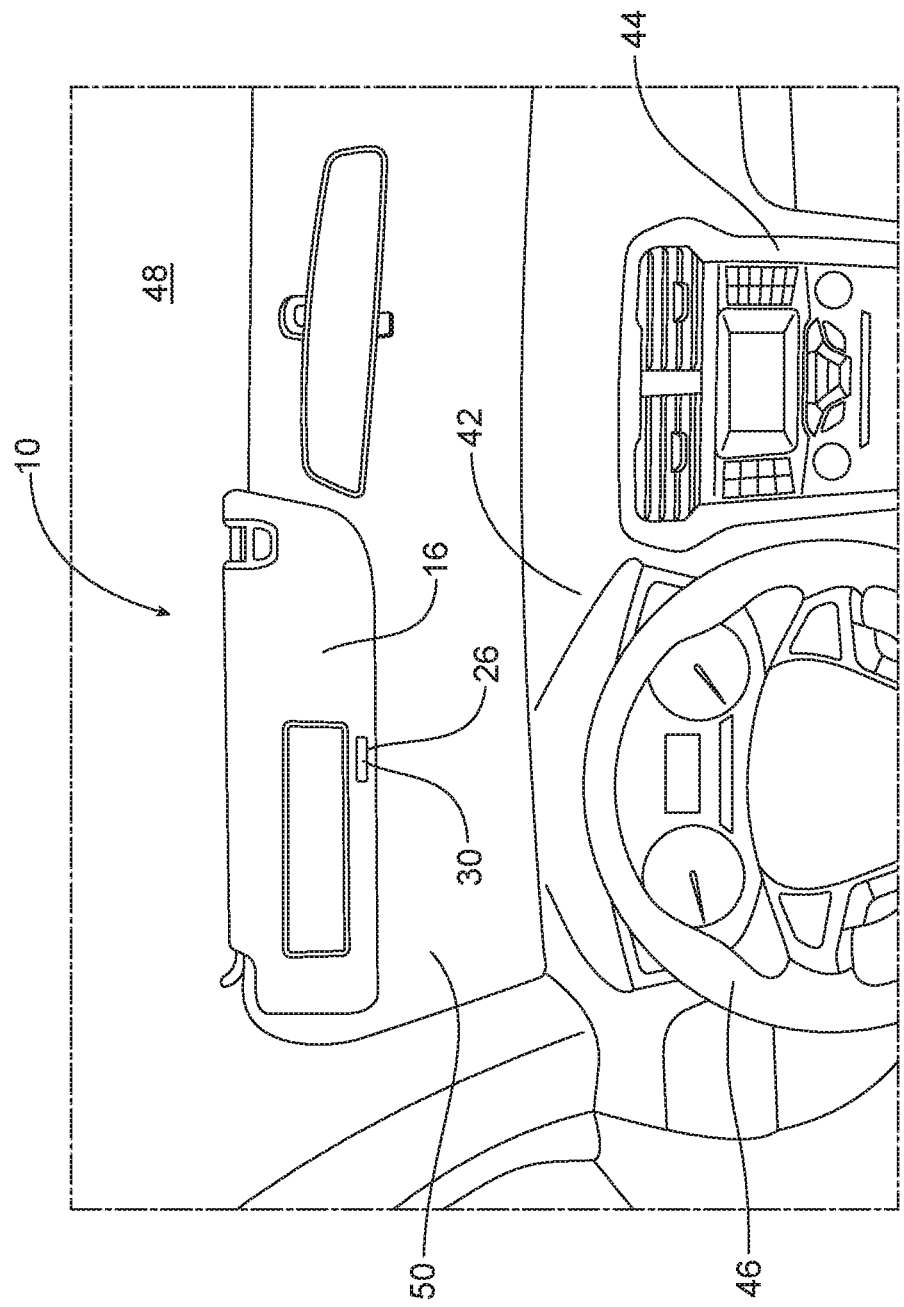
FIG. 3 is a view similar to FIG. 2 but showing the sun visor assembly lowered into a use position so as to extend the sun visor assembly downward across the upper portion of the windshield.

Reference is now made to FIG. 2 illustrating the interior 40 of a motor vehicle including the instrument panel 42, the center stack 44 and the steering wheel 46. As illustrated in FIG. 2, the sun visor assembly 10 is in a raised or stowed position wherein the body 12 is folded flat along the headliner 48. In this position, the first grille 28 and first sound port 24 are oriented downward and toward the driver so that the sound of the driver's voice will freely enter the first sound port 24 and be directed by the first acoustic surface 32 of the baffle 22 toward the microphone 20 in an efficient and effective manner.

In contrast, when the sun visor assembly 10 is in a lowered or use position with the body 12 extending down over the top of the windshield 50, the second grille 30 and second sound port 26 are oriented toward the driver. In this position the sound of the driver's voice enters the second sound port 26 and is efficiently and effectively directed to the microphone 20 by the second acoustic surface 34 of the baffle 22.

As should be appreciated, the first and second sound ports 24, 26 function with the unique baffle 22, including the first and second acoustic surfaces 32, 34, to effectively provide a unidirectional microphone 20 with omnidirectional ability. As a result, voice commands and voice communication from the driver may be efficiently and effectively detected regardless of the position of the body 12 of the sun visor assembly 10. Advantageously, this is done while (a) eliminating parts (e.g. discreet bezels and connectors between the microphone and those bezels), (b) reducing wire length leading to the microphone 20, (c) reducing tooling, assembly and production costs, (d) improving fit and finish, (e) enhancing microphone/voice commands/voice communication performance and (f) optimizing the location of the microphone 20 for improved functionality. Advantageously, this all results in improved customer satisfaction.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A sun visor assembly, comprising:
    a body having (a) a first face including a first sound port, (b) a second face including a second sound port and (c) an internal receiver between said first face and said second face;
    a single microphone held in said internal receiver; and
    a baffle carried on said body and configured to direct sound from said first sound port and said second sound port toward said single microphone.

2. The sun visor assembly of claim 1, further including a first grille integrated into said first face over said first sound port.

3. The sun visor assembly of claim 2, further including a second grille integrated into said second face over said second sound port.

4. The sun visor assembly of claim 3, wherein said baffle includes a first acoustic surface oriented toward said first sound port.

5. The sun visor assembly of claim 4, wherein said baffle includes a second acoustic surface oriented toward said second sound port.

6. The sun visor assembly of claim 5, wherein said first acoustic surface is arcuate.

7. The sun visor assembly of claim 6, wherein said second acoustic surface is arcuate.

8. The sun visor assembly of claim 7, wherein said first acoustic surface converges toward said second acoustic surface from a first end of said baffle toward a second end of said baffle.

9. The sun visor assembly of claim 8, wherein said second end is oriented toward said microphone.

10. The sun visor assembly of claim 1, wherein said baffle includes a first acoustic surface oriented toward said first sound port.

11. The sun visor assembly of claim 10, wherein said baffle includes a second acoustic surface oriented toward said second sound port.

12. The sun visor assembly of claim 11, wherein said first acoustic surface is arcuate.

13. The sun visor assembly of claim 12, wherein said second acoustic surface is arcuate.

14. The sun visor assembly of claim 13, wherein said first acoustic surface converges toward said second acoustic surface from a first end of said baffle toward a second end of said baffle.

15. The sun visor assembly of claim 14, wherein said second end is oriented toward said microphone.

* * * * *